Oct. 26, 1926.

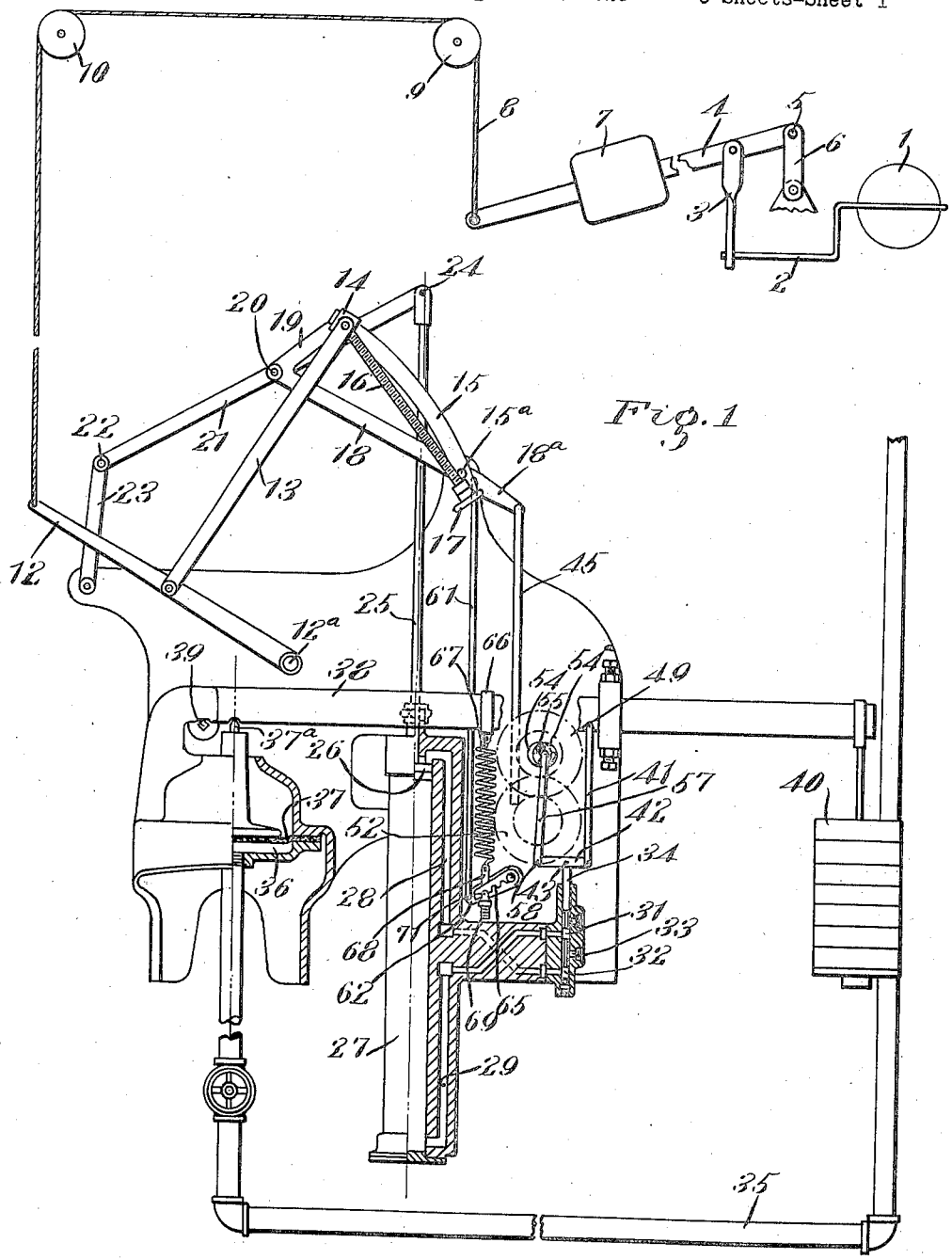

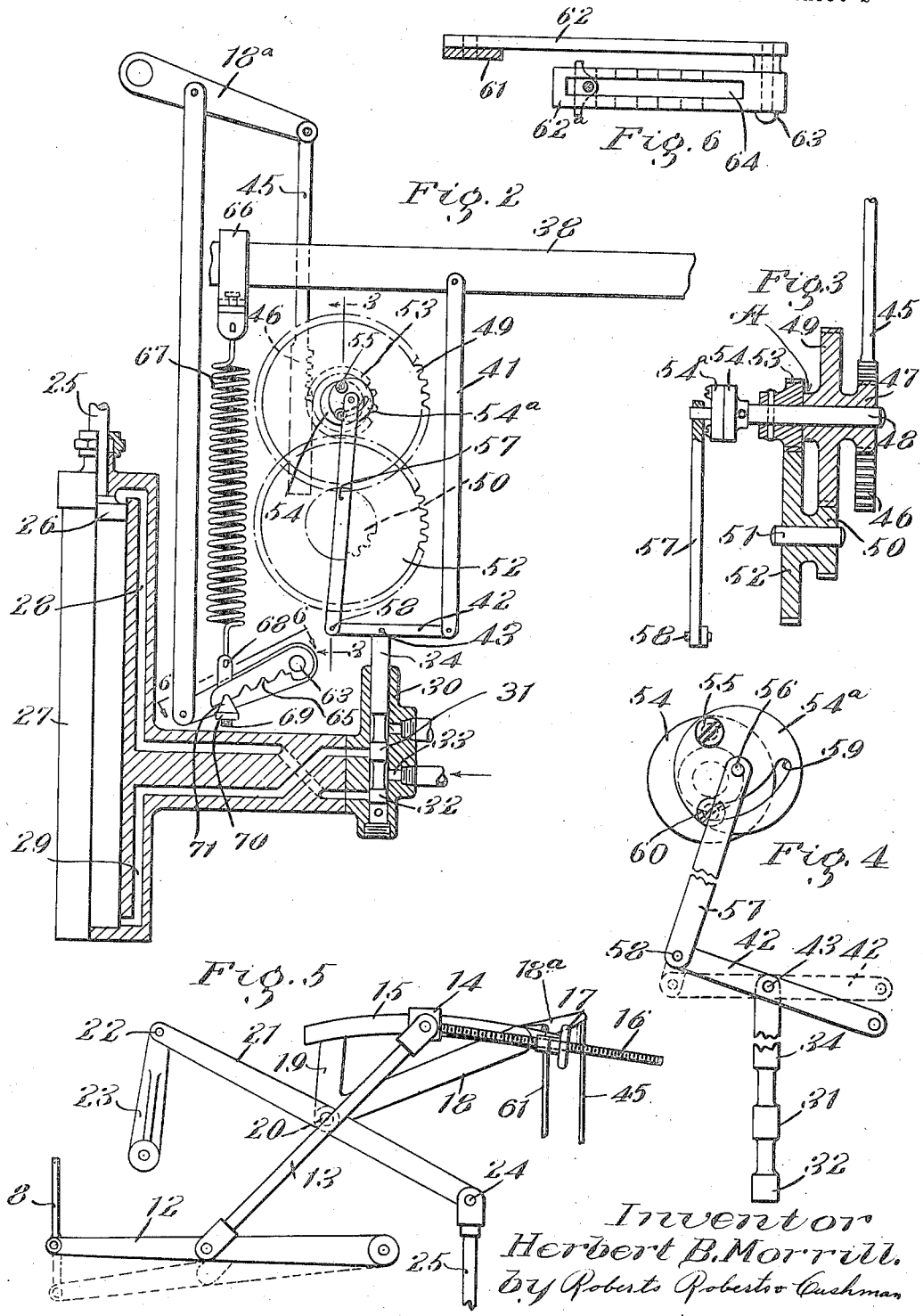

H. B. MORRILL 1,604,530

PRESSURE CONTROLLING APPARATUS

Filed August 29, 1925    3 Sheets-Sheet 3

Inventor
Herbert B. Morrill,
by Roberts Roberts & Cushman
Att'ys.

Patented Oct. 26, 1926.

1,604,530

UNITED STATES PATENT OFFICE.

HERBERT B. MORRILL, OF SALEM, MASSACHUSETTS.

PRESSURE-CONTROLLING APPARATUS.

Application filed August 29, 1925. Serial No. 53,363.

This invention relates to automatic pressure regulators and more particularly to regulators of that type which comprise a pressure responsive element adapted in accordance with variations in pressure to move the admission valve of a fluid motor in one direction or the other, thereby controlling the operation of said motor which in turn operates a valve, damper, switch, or other element whose position either directly or indirectly determines the pressure in the system with which the controlling apparatus is associated.

Such regulators as usually constructed, even when provided with so-called "compensators", exhibit a tendency to creep or slowly to travel in one or the other direction, so that the valve, damper, or other controlled element is more or less constantly in motion and is frequently opened or closed beyond the proper amount, resulting in uneconomical operation, while the constant movement of the parts results in undue wear and rapid deterioration.

The principal object of the present invention is to provide means by which the slow creeping movement of the controlled element may be eliminated and which provides a quick and positive regulating operation such that the controlled element responds promptly to pressure variations, but after adjustment remains for a very considerable period in the same position.

To this end I provide means for actuating the admission valve of the fluid motor at a speed much greater than that which would result merely from the direct action of the pressure responsive element, and preferably cause said admission valve to advance or retreat in a series of progressive steps, each step comprising a forward stage followed by a reverse stage of slightly less extent. Preferably the length of such steps is adjustable.

As a secondary result of the employment of the apparatus of the present invention, I find not only that the usual slow creeping of the controlled element, for example a damper, is eliminated, but I also find that the regulation is far more perfect and that the total change in position of the controlled element is very much less than is usually the case. Thus, in practice, in controlling a flue damper through which steam pressure is indirectly regulated, I find that the total movement of the damper during the course of its run may not exceed one-quarter of the total opening, resulting in a much more even fire and economical consumption of fuel.

In the accompanying drawings, I have illustrated one preferred embodiment of the invention by way of example and in the drawings:

Fig. 1 is a front elevation partly in section and partly diagrammatic showing the improved controlled mechanism arranged to actuate a flue damper;

Fig. 2 is a fragmentary elevation showing certain of the parts illustrated in Fig. 1 to larger scale;

Fig. 3 is a vertical section substantially on the line 3—3 of Fig. 2;

Fig. 4 is a front elevation to larger scale showing in detail certain of the parts illustrated in Figs. 1 and 2;

Fig. 5 is a fragmentary elevation illustrating the usual operation of certain parts of the improved controller;

Fig. 6 is a section substantially on the line 6—6 of Fig. 2; and

Figure 7:
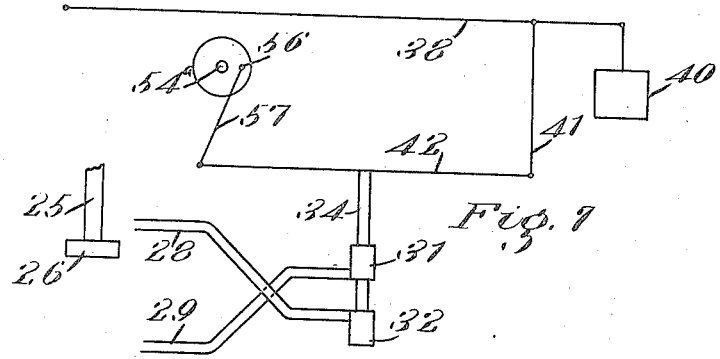
Figs. 7, 8, 9 and 10 are diagrammatic views illustrating the operation of the device.

Referring to the drawings, the numeral 1 designates a flue damper herein shown as illustrative of any of various devices, for example dampers, valves, switches, etc., which may be employed for controlling fluid pressure, either directly or indirectly, and which will hereinafter be referred to broadly as valves.

The element 1 as herein illustrated is provided with a crank arm 2 connected by a link 3 to a lever 4 pivotally secured at 5 to a rock arm 6 mounted upon any suitable fixed support. The lever 4 may be provided with an adjustable weight 7 tending to move the link 3 downwardly.

The free end of the lever 4 is connected by means of a chain or cord 8 passing over pulleys 9 and 10 to the end of a radius arm 12 pivotally supported at 12$^a$ upon a suitable part of the frame of the controlling apparatus. A link 13 is pivotally secured at one end to the cross head 14, slidable on the sector 15 fulcrumed at 15$^a$ and at its other end is pivotally connected to the radius rod 12. The point where the link 13 is pivoted to the rod 12 forms the center of curvature of the sector 15 so that the cross head 14 with the link 13 may be moved along the sector 15 without changing the relation between the rod 12 and the sector, said cross head 14 being adjustable toward and from the fulcrum 15ᵃ of said sector 15 by means of a screw 16 actuated by a hand wheel 17.

The sector is provided with converging members 18 and 19 extending from its opposite ends to the point 20 where they are united and are pivotally connected to a link 21 pivotally supported at 22 upon the end of a rocker 23 and connected by a pivot 24 at its other end to the upper end of a piston rod 25.

This piston rod forms an element of a fluid motor and is provided with a piston head 26 at its lower end which reciprocates in a cylinder 27. Fluid ports or passages 28 and 29 lead to the upper and lower ends respectively of the cylinder 27 from a valve chest 30 containing a reciprocating piston valve having spaced heads 31 and 32, and a stem 34. Pressure fluid for actuating the piston 26 is admitted to the valve chest through a port 33 and suitable exhaust passages are provided in the valve chest for permitting the escape of fluid from the ends of the cylinder 27.

A pipe 35, extending from the boiler, tank, pipe, or other vessel in which the pressure is to be regulated, communicates with a chamber 36 beneath a flexible diaphragm 37. This diaphragm is provided with an upwardly extending stem 37ᵃ which engages a notch in the lower edge of a lever 38 fulcrumed at 39 closely adjacent to its point of engagement of the stem 37ᵃ. The free end of the lever 38 is provided with a suitable weight 40.

A link 41 connects the lever 38 with one end of a lever 42 which is pivotally connected at a point intermediate its ends by means of a pin 43 to the upper end of the stem 34 of the piston valve.

The member 18 of the sector 15 projects to the right of the fulcrum 15ᵃ as viewed in Fig. 1, forming a short lever arm 18ᵃ. A bar 45 extends downwardly from the end of this short lever arm and this bar is provided near its lower end with a rack 46 which meshes with a pinion 47 turning freely upon a shaft 48. A gear 49 of larger diameter than the pinion 47 is secured to the latter to turn therewith. The gear 49 may be integral with the pinion 47 or made as a separate element and attached thereto as may be desired.

The gear 49 meshes with a relatively small pinion 50 turning upon a stub shaft 51, and a gear 52 larger than the pinion 50 is secured to the latter, either integrally or otherwise, and meshes with a relatively small pinion 53 keyed to the shaft 48.

To the forward end of the shaft 48 a disk 54 is secured. This disk carries an eccentric pivot pin 55 (Fig. 4) upon which a second disk 54ᵃ is pivotally mounted. The disk 54ᵃ is provided with a centrally disposed crank pin 56 to which the upper end of a connecting rod 57 is attached. The lower end of the connecting rod 57 is pivotally secured at 58 to the end of the lever 42 opposite to that to which the link 41 is secured.

The disk 54ᵃ is furnished with an arcuate slot 59 for the reception of a set screw 60 engaging a threaded opening in the disk 54. By swinging the disk 54ᵃ about its pivot 55 the crank pin 56 may be disposed eccentrically with respect to the shaft 48 and its throw may be varied in this manner, the disk 54 being held in adjusted position by tightening the screw 60.

A link 61 is pivoted at its upper end to the short lever arm 18ᵃ of the sector 15 and is connected at its lower end to a rock arm 62 pivotally supported at 63. This rock arm is furnished with a part 62ᵃ having an elongated slot 64 and the lower edge of the part 62ᵃ is provided with spaced notches 65.

A collar 66 encircles the lever 38 and supports a tension spring 67 by means of a swivel joint. A stem member 68 is secured to the lower end of the spring 67 and extends down through the slot 64 of the rocker member 62. The lower end of the stem 68 is screw threaded at 69 for engagement by a nut 70 having a tooth 71 adapted to engage any selected one of the notches 65 in the rocker member, thus permitting a coarse adjustment of the tension of the spring. The spring being swivelled at its upper end to the collar 66 may be turned on its own axis so that the stem 68 may be rotated in the nut 70, thus affording a fine adjustment of the spring tension.

Figure 8:
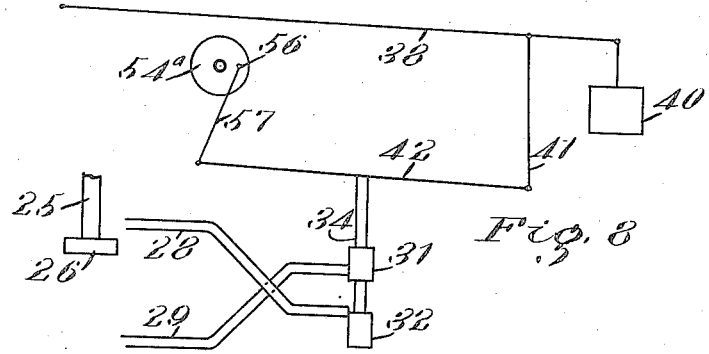

In the operation of the device and assuming that the parts are positioned as shown in Fig. 1, any decrease in pressure beneath the diaphragm 37 permits the lever 38 to move downwardly to a slight extent. This downward movement is communicated through the link 41 and the rocker 42 to the piston valve, moving the latter from the position shown in Figs. 1 and 7 to that shown in Fig. 8. In the latter position the head 32 of the piston valve which in this instance constitutes the admission valve, has moved down to a slight extent, partly uncovering the port or passage 28 and admitting a small amount of fluid from the supply port 33 to the upper end of the cylinder 27. The piston now begins to move down slowly, swinging the link 21 downwardly and swinging the sector 15 in a counterclockwise direction about its fulcrum 15ᵃ. This swings the rocker 12 in the same direction and raises the lever 4, thus turning the damper or valve 1 in the proper direction to increase the pressure, either directly or indirectly in the chamber 36.

With the parts adjusted as shown in Fig. 1 the maximum ratio of movement between the damper or valve 1 and the piston 26 is provided. By adjusting the cross head 14 on the sector 15 the ratio of movement between the valve or damper 1 and the piston 26 may, obviously, be progressively decreased until the extreme maximum point of adjustment of the cross head 14 opposite the adjustment shown in Fig. 1 is reached, whereupon the movement of the piston 26 will impart no corresponding movement to the damper or valve 1. If the cross head is adjusted to a position midway the sector 15 as shown in Fig. 5 the ratio of movement between the damper or valve 1 and the piston 26 is one-half the ratio of movement between the said damper and piston when the parts are in the position shown in Fig. 1.

Figure 9:
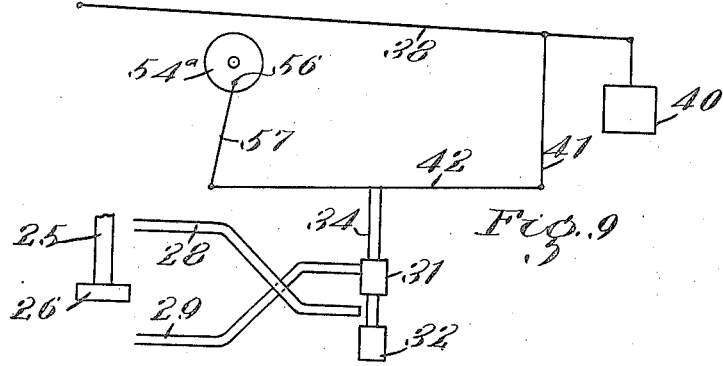

As the sector 15 swings in the direction above described, the arm 18a swings upwardly, thus causing the rack 46 to rise and turning the pinion 47 in a clockwise direction. Through the multiplying gearing above described the pinion 53 is caused to turn in a clockwise direction but at greater speed than the pinion 47, a suitable ratio of movement being 8 to 1. This movement of the pinion 53 on the shaft 48 causes the crank pin 56 to move down rapidly until it occupies some such position as shown in Fig. 9. This movement of the crank pin 56 is transmitted through the connecting rod 57 to the rocker 42 and thus to the valve stem 34 and rapidly lowers the admission valve head 32 so as to give a full and unobstructed passage of fluid from the admission port 33 to the upper end of the cylinder. This sudden admission of pressure fluid through the unobstructed port causes the piston 26 to move downwardly at a greatly accelerated velocity and through the connections described the damper or valve 1 is moved very rapidly instead of at the slow rate at which it would normally be moved were the admission valve controlled only by the diaphragm 37.

Figure 10:
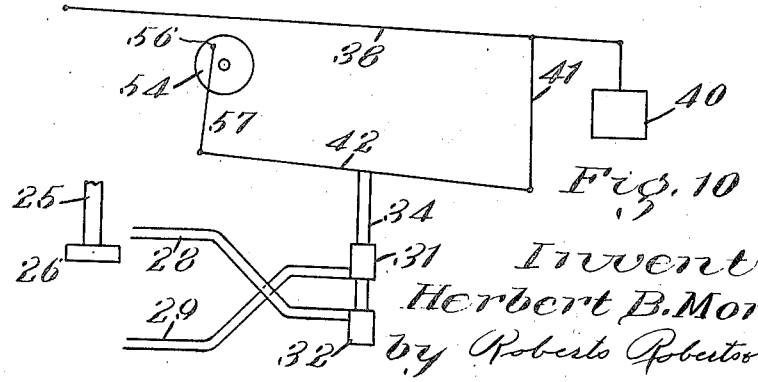

This rapid movement of the piston 26 also causes an accelerated upward movement of the arm 18a and thus quickly turns the crank pin 56 to a position such for example as shown in Fig. 10. This upward movement of the crank pin immediately closes the admission valve 32 and cuts off the fluid flow to the upper end of the cylinder.

During the above described series of operations the tension on the spring 67 has been somewhat decreased so that there is less tendency for the lever 38 to move downwardly. If the movement of the valve 1 occasioned as above described does not result in sufficient regulation of the pressure in the boiler or other device the lever 38 will again move down but with a slightly decreasing speed due to the decreased tension of the spring 67, and if the admission valve again be opened slightly as above described the sequence of operations will be repeated, the valve first being opened wide with great rapidity and then closed.

The net result of the above mode of operation is that in making a full stroke from one end of the cylinder to the other the piston progresses in a series of intermediate steps or stages each of which causes a slight over regulation of the controlling valve, such over regulation ordinarily being sufficient to prevent the necessity for an immediate repetition of the operation and usually being sufficient to secure all the necessary regulation.

This provision of means for slightly over regulating the controlling valve is found to result in maintaining the controlling valve within a very short range of movement during ordinary conditions whereas without the secondary control here provided the controlling valve may move more or less constantly and be opened or closed much more than is necessary. With the present arrangement the range of movement of the controlling valve is very small and its movement takes place only at spaced intervals of time. Thus as illustrated in Fig. 5 with the cross head 14 substantially midway of the sector, the total swinging of the radius rod 12 may not exceed that indicated by the full and dotted lines in this figure.

While I regard the arrangement herein disclosed as desirable for the intended purpose, I contemplate that other and equivalent arrangements of parts may be substituted therefor without departing from the spirit of the invention.

I claim:

1. Apparatus of the class described comprising a fluid motor, an admission valve therefor, means for slowly opening said valve to admit pressure fluid to the motor, and means actuable by the motor for opening the admission valve at a relatively rapid rate.

2. Apparatus of the class described comprising a fluid motor, an admission valve therefor, a pressure responsive device for slowly opening said valve to admit pressure fluid to the motor, and means operative after the motor starts to open the admission valve at a more rapid rate.

3. Apparatus for controlling the operation of a part whose position determines the fluid pressure in a vessel, said apparatus comprising a device sensitively responsive to variations in pressure in said vessel, means actuable by the said pressure responsive device tending slowly to move said part, and means operable as soon as said part begins to move to accelerate its motion in the same direction.

4. Apparatus for controlling the operation of a pressure regulating valve comprising a device sensitively responsive to variations in the fluid pressure to be regulated, a motor for moving the valve, means actuable by the pressure sensitive device in responding to pressure variations to initiate slow operation of the motor, and means actuable by the motor for accelerating its own movement in the same direction.

5. Apparatus for controlling the operation of a pressure regulating valve comprising a fluid motor for operating the valve, said motor having a reciprocating piston, a pressure responsive device for initiating operation of the motor, and means including a rotary crank actuable by the motor constraining the piston to progress in a series of intermittent steps.

6. Apparatus for controlling the operation of a pressure regulating valve comprising a fluid motor for operating the valve, said motor having a reciprocating piston, a pressure responsive device for initiating operation of the motor, a fluid admission valve for the motor, means connecting the pressure responsive device to the admission valve whereby slowly to open the latter in response to varying pressure acting on said device, and means actuable by the motor for rapidly moving the admission valve toward and from fully open position whereby to cause the piston to progress intermittently.

7. Apparatus of the class described comprising a fluid motor having a piston, an admission valve for the motor, a pressure responsive device for initiating opening movement of the valve to admit fluid to the motor thereby to move the piston, and means actuable by the piston for accelerating the opening movement of the admission valve.

8. Apparatus of the class described comprising a fluid motor having a piston, an admission valve for the motor, a pressure responsive device for initiating opening movement of the valve to admit fluid to the motor thereby to move the piston, and means actuable by the piston for rapidly opening the admission valve and for quickly closing it.

9. Apparatus of the class described comprising a fluid motor having a piston, an admission valve for the motor, a pressure responsive device for initiating opening movement of the valve to admit fluid to the motor thereby to move the piston, a multiplying gear train actuable by the piston, and connections between the gear train and admission valve for opening and closing the latter.

10. Apparatus of the class described comprising a fluid motor having a piston, an admission valve for the motor, a pressure responsive device for initiating opening movement of the valve to admit fluid to the motor thereby to move the piston, a rotary crank, connections between the crank and admission valve, and means actuable by the piston for turning the crank.

11. Apparatus for controlling the operation of a pressure regulating valve comprising a device sensitively responsive to variations in the fluid pressure to be regulated, a motor for moving the valve, means actuable by the pressure sensitive device in responding to pressure variations to initiate slow operation of the motor, and means actuable by the motor first to accelerate its motion in the same direction and then to decrease its rate of movement.

12. Apparatus of the class described comprising a fluid motor having a piston, an admission valve for the motor, a pressure responsive device for initiating opening movement of the valve to admit fluid to the motor thereby to move the piston, and means including a rotary crank driven by the motor for causing the piston to progress in a series of intermittent steps.

13. Apparatus for controlling the operation of a pressure regulating valve comprising a fluid motor for operating the valve, said motor having a reciprocating piston, a pressure responsive device for initiating operation of the motor, a fluid admission valve for the motor, means connecting the pressure responsive device to the valve whereby slowly to open the latter in response to varying pressure acting on said device, a multiplying gear train actuable by the piston, and means operable by said gear train for moving the admission valve alternately toward and from fully open position.

14. Apparatus for controlling the operation of a pressure regulating valve comprising a fluid motor for operating the valve, said motor having a reciprocating piston, a pressure responsive device for initiating operation of the motor, a fluid admission valve for the motor, means connecting the pressure responsive device to the valve whereby slowly to open the latter in response to varying pressure acting on said device, a rotary crank, connections between the crank and the admission valve to open and close the valve as the crank rotates, and means actuable by the piston in moving from one end of its path to the other for rotating the crank a plurality of times.

15. Apparatus for controlling the operation of a pressure regulating valve comprising a fluid motor for operating the valve, said motor having a reciprocating piston, a pressure responsive device for initiating operation of the motor, and means actuable by the motor for first accelerating and then retarding the motion of the valve.

16. Apparatus for controlling the operation of a pressure regulating valve comprising a fluid motor for operating the valve, said motor having a reciprocating piston, a pressure responsive device for initiating operation of the motor, and means actuable by the motor for accelerating its motion.

17. Apparatus of the class described comprising a fluid motor having a piston, an admission valve for the motor, a pressure responsive device for initiating opening movement of the valve to admit fluid to the motor thereby to move the piston, and means actuable by the piston during one stroke of the latter for moving the admission valve first in one direction and then in the other.

18. Apparatus of the class described comprising a fluid motor, an admission valve therefor, means for slowly opening said valve to admit pressure fluid to the motor, and means actuable by the motor for opening the admission valve at a relatively rapid rate, and for subsequently closing it at a rapid rate.

19. Apparatus of the class described comprising a fluid motor having a piston, an admission valve for the motor, a pressure responsive device for initiating opening movement of the valve to admit fluid to the motor thereby to move the piston, a rotary crank, connections between the crank and admission valve, and motion multiplying means actuable by the piston for turning the crank rapidly thereby to move the admission valve.

20. Apparatus for controlling the operation of a pressure regulating valve, comprising a fluid motor having a piston and piston rod, connections for transmitting movement of the piston rod to the regulating valve, an admission valve for the motor, a lever for moving the valve, means opposing a constant resistance to movement of the lever in a direction to open its valve, a pressure responsive device for moving the lever to open the valve, a tension spring connected at one end to the lever, a rocker arm provided with a plurality of spaced notches, a part at the other end of the spring optionally engageable with any of said notches, and means operable by the piston rod for oscillating the rocker.

21. Apparatus for controlling the operation of a pressure regulating valve, comprising a fluid motor having a piston and piston rod, connections for transmitting movement of the piston rod to the regulating valve, an admission valve for the motor, a lever for moving the valve, means opposing a constant resistance to movement of the lever in a direction to open the valve, a pressure responsive device for moving the lever to open the valve, a tension spring connected at one end to the lever, a slotted rocker arm provided with a series of spaced notches, a stem connected to the opposite end of the spring and projecting through the slot, and a member secured to the end of the stem for selective engagement with said notches, and means operable by the piston for oscillating the rocker.

22. Apparatus for controlling the operation of a pressure regulating valve, comprising a fluid motor having a piston and piston rod, connections for transmitting movement of the piston rod to the regulating valve, an admission valve for the motor, a lever for moving the valve, means opposing a constant resistance to movement of the lever in a direction to open the valve, a pressure responsive device for moving the lever to open the valve, a tension spring having a swivel connection at one end to the lever, a slotted rocker arm provided with a series of spaced notches in its lower edge, a stem secured to the other end of the spring and projecting down through the slot in the rocker, the lower end of the stem being screw threaded, a nut engaging the threaded end of the stem, said nut having a tooth optionally engageable with the notches of the rocker, and means operable by the piston rod for oscillating the rocker.

23. Apparatus for controlling the operation of a pressure regulating valve comprising a fluid motor having a piston and piston rod, connections for transmitting movement of the piston rod to the regulating valve, an admission valve for the motor, a pressure responsive device, a rocker connected at one end to the pressure responsive device, means actuated by the motor for rapidly oscillating the rocker, and means connecting the rocker to the admission valve.

24. Apparatus for controlling the operation of a pressure regulating valve comprising a fluid motor having a piston and piston rod, connections for transmitting movement of the piston rod to the regulating valve, an admission valve for the motor, a pressure responsive device, a lever actuable by the pressure responsive device, a rocker connected intermediate its ends to the admission valve, means actuable by the lever and means actuable by the piston respectively for moving the opposite ends of the rocker, said last named means comprising a rotary crank driven by the piston at a linear speed greater than that of the piston.

25. Apparatus for controlling the operation of a pressure regulating valve comprising a fluid motor having a piston and piston rod, connections for transmitting movement of the piston rod to the regulating valve, an admission valve for the motor, a pressure responsive device, a lever actuable by the pressure responsive device, a rocker, means connecting the admission valve to the rocker at a point intermediate the ends of the latter, a link connecting one end of the rocker with the lever, and means interposed between the other end of the rocker and the piston for moving the latter end of the rocker alternately in opposite directions as the piston moves from one end of the path to the other.

26. Apparatus for controlling the operation of a pressure regulating valve comprising a fluid motor having a piston and piston rod, connections for transmitting movement of the piston rod to the regulating valve, an admission valve for the motor, a pressure responsive device, a lever actuable by the pressure responsive device, a rocker, means connecting the admission valve to the rocker at a point intermediate the ends of the latter, a link connecting one end of the rocker with the lever, a rotary crank connected to the opposite end of the rocker, and means actuable by the piston for rotating the crank.

27. Apparatus for controlling the operation of a pressure regulating valve comprising a fluid motor having a piston and piston rod, connections for transmitting movement of the piston rod to the regulating valve, an admission valve for the motor, a pressure responsive device, a lever actuable by the pressure responsive device, a rocker, means connecting the admission valve to the rocker at a point intermediate the ends of the latter, a link connecting one end of the rocker with the lever, a rotary crank connected to the opposite end of the rocker, and a multiplying gear train actuable by the piston for rotating the crank at a high linear speed as compared with that of the piston.

28. Apparatus for controlling the operation of a pressure regulating valve comprising a fluid motor having a piston and piston rod, means for transmitting movement of the piston rod to the regulating valve whereby the ratio of movement between said regulating valve and piston rod is variable, an admission valve for the motor, a pressure responsive device, and connections actuable jointly by the piston and pressure responsive device for determining the position of the admission valve.

29. Apparatus for controlling the operation of a pressure regulating valve comprising a fluid motor having a piston and piston rod, adjustable connections for transmitting movement of the piston rod to the regulating valve whereby the ratio of movement between said regulating valve and piston rod may be varied, an admission valve for the motor, a pressure responsive device, a lever actuable by the pressure responsive device, a rocker, means connecting the admission valve to the rocker at a point intermediate the ends of the latter, a link connecting one end of the rocker with the lever, a rotary crank connected to the opposite end of the rocker, and a multiplying gear train actuable by the piston for rotating the crank.

Signed by me at Boston, Massachusetts, this 25th day of August, 1925.

HERBERT B. MORRILL.